(12) United States Patent
Hoener et al.

(10) Patent No.: US 10,732,357 B2
(45) Date of Patent: Aug. 4, 2020

(54) FIBER TERMINATION ASSEMBLY

(71) Applicant: nLIGHT, Inc., Vancouver, WA (US)

(72) Inventors: Kylan Hoener, Portland, OR (US); David C. Dawson, Vancouver, WA (US); Kevin A. Shea, Bayville, NY (US); R. Kirk Price, Seattle, WA (US)

(73) Assignee: nLIGHT, Inc., Vancouver, WA (US)

( * ) Notice: Subject to any disclaimer, the term of this patent is extended or adjusted under 35 U.S.C. 154(b) by 126 days.

(21) Appl. No.: 14/921,203

(22) Filed: Oct. 23, 2015

(65) Prior Publication Data

US 2016/0178849 A1    Jun. 23, 2016

Related U.S. Application Data

(63) Continuation of application No. 13/680,836, filed on Nov. 19, 2012, now Pat. No. 9,195,006.

(51) Int. Cl.
| | |
|---|---|
| *G02B 6/38* | (2006.01) |
| *G02B 6/14* | (2006.01) |
| *G02B 6/32* | (2006.01) |
| *G02B 6/24* | (2006.01) |

(Continued)

(52) U.S. Cl.
CPC ............ *G02B 6/3813* (2013.01); *G02B 6/14* (2013.01); *G02B 6/241* (2013.01); *G02B 6/32* (2013.01); *G02B 6/3814* (2013.01); *G02B 6/3838* (2013.01); *G02B 6/3845* (2013.01); *G02B 6/3869* (2013.01); *G02B 6/3874* (2013.01);

(Continued)

(58) Field of Classification Search
CPC . G02B 1/02; G02B 5/284; G02B 6/02; G02B 6/2746; G02B 6/2852; G02B 6/4296; H01S 5/02208; H01S 5/02276; H01S 5/02284; H01S 5/02415; H01S 5/06804
See application file for complete search history.

(56) References Cited

U.S. PATENT DOCUMENTS

| | | |
|---|---|---|
| 4,162,821 A | 7/1979 | Schumacher |
| 4,303,304 A | 12/1981 | Ruiz |
| 4,920,366 A | 4/1990 | Bowen et al. |

(Continued)

OTHER PUBLICATIONS

Notice of Allowance from the U.S. Patent and Trademark Office in co-pending U.S. Appl. No. 13/680,836, dated Jul. 23, 2015.

(Continued)

*Primary Examiner* — Ryan A Lepisto
*Assistant Examiner* — Erin D Chiem
(74) *Attorney, Agent, or Firm* — Klarquist Sparkman, LLP

(57) ABSTRACT

A fiber termination assembly includes an optical fiber inserted into an optical ferrule disposed in an optical passageway of a heat conductive housing, the optical passageway providing an optical path aligned with the openings of the housing, the optical ferrule including a central bore concentrically disposed about the optical path and configured to receive a portion of a proximal end of the optical fiber therein, the optical ferrule and optical fiber secured in relation to the heat conductive housing with epoxy at a distal end of the optical ferrule, wherein the optical ferrule is transparent at a predetermined wavelength of light such that for light coupled into an input surface of the proximal end of the optical fiber at least a portion of the light propagating as cladding modes is stripped out of the optical fiber and transported to and dissipated in the heat conductive housing.

23 Claims, 2 Drawing Sheets

(51) Int. Cl.
*G02B 6/42* (2006.01)
*G02B 6/28* (2006.01)

(52) U.S. Cl.
CPC .......... *G02B 6/2852* (2013.01); *G02B 6/4269* (2013.01); *G02B 6/4296* (2013.01)

(56) References Cited

U.S. PATENT DOCUMENTS

| | | | |
|---|---|---|---|
| 5,253,312 | A | 10/1993 | Payne et al. |
| 5,812,723 | A | 9/1998 | Ohtsu et al. |
| 5,857,053 | A | 1/1999 | Kane |
| 5,966,485 | A | 10/1999 | Luther et al. |
| 6,282,349 | B1 | 8/2001 | Griffin |
| 6,535,671 | B1 * | 3/2003 | Poole .................. G02B 6/2852 385/32 |
| 7,204,645 | B2 | 4/2007 | Brown |
| 7,280,733 | B2 | 10/2007 | Larson et al. |
| 7,400,794 | B1 * | 7/2008 | Pang ...................... G02B 6/262 385/123 |
| 7,435,012 | B1 | 10/2008 | Beldycki |
| 7,488,116 | B2 | 2/2009 | Steve |
| 7,540,668 | B2 | 6/2009 | Brown |
| 8,057,106 | B1 | 11/2011 | Zhovnirovsky et al. |
| 8,721,631 | B2 | 5/2014 | Neuberger |
| 9,223,085 | B2 * | 12/2015 | Huber .................. G02B 6/4296 |
| 2006/0171631 | A1 | 8/2006 | Scerbak et al. |
| 2007/0172174 | A1 | 7/2007 | Scerbak et al. |
| 2008/0165418 | A1 | 7/2008 | Scerbak et al. |
| 2009/0169151 | A1 * | 7/2009 | Neitzel ................... G01L 1/243 385/12 |
| 2010/0135339 | A1 * | 6/2010 | Meleshkevich .... G02B 6/03616 372/6 |
| 2012/0320451 | A1 * | 12/2012 | Muendel ........... H01S 3/094007 359/341.31 |
| 2013/0011102 | A1 * | 1/2013 | Rinzler ................ G02B 6/3813 385/89 |

OTHER PUBLICATIONS

Office Action from the U.S. Patent and Trademark Office in co-pending U.S. Appl. No. 13/680,836, dated Jun. 20, 2014.
Final Office Action from the U.S. Patent and Trademark Office in co-pending U.S. Appl. No. 13/680,836, dated Dec. 5, 2014.
Office Action from the U.S. Patent and Trademark Office in co-pending U.S. Appl. No. 13/339,045, dated Jan. 15, 2015.
Office Action from the U.S. Patent and Trademark Office in co-pending U.S. Appl. No. 13/339,045, dated Aug. 27, 2015.
Notice of Allowance from the U.S. Patent and Trademark Office in co-pending U.S. Appl. No. 13/339,045, 8 pages, dated Jul. 15, 2016.
Office Action from the United States Patent & Trademark Office in co-pending U.S. Appl. No. 13/339,045, 8 pages, dated Feb. 25, 2016.

* cited by examiner

FIBER TERMINATION ASSEMBLY

CROSS REFERENCE TO RELATED APPLICATION

This application is a continuation of U.S. application Ser. No. 13/680,836, entitled "FIBER TERMINATION ASSEMBLY" and filed Nov. 19, 2012, which is incorporated herein by reference.

FIELD

Generally, the field of the present invention is optical fiber termination. More particularly, the present invention relates to a fiber termination assembly for high power applications.

BACKGROUND

Optical systems often utilize optical fibers to transport optical signals and optical powers between system components or to a workpiece. Coupling light into fibers for subsequent transport presents several technical challenges that must be overcome. Incident light and optical fiber characteristics, such as wavelengths, numerical apertures, core and cladding features, refractive indices, etc., determine in significant part what and how much light may be coupled into an optical fiber. As incident optical powers increase, even with perfect alignment conditions, additional problems can arise. In some situations, those problems can lead to catastrophic failure in proximity to the coupling between the incident light and the optical fiber, at other portions of the fiber termination assembly, as well as at other components of the optical system connected to the fiber termination assembly.

In U.S. Pat. No. 6,282,349 to Griffin a launch fiber termination discloses a silica or quartz ferrule having a bore in which an optical fiber is inserted and heat fused to the interior bore surface. A beam block has an extension that surrounds a polymer jacket of the inserted fiber and is crimped onto the jacket. In general, use of epoxy is to be avoided since it tends to contaminate a laser output lens, and is prone to explosive failure. While epoxy may be convenient for construction of various termination assemblies, epoxy failures become more likely at higher energy levels leading to further restriction on use. Moreover, different work-arounds have been employed to mitigate failures while preserving the utility of epoxy. For example, multiple adhesives may be used, such as temporary adhesives. However, the yield advantages of epoxy-type terminations tend to be lost as the process becomes more complex. Additionally, these approaches tend to require removal of the outer cladding which should not be removed since it performs a cladding role in maintaining internal reflection. Accordingly, it has remained a challenge in the art of fiber termination to provide a high-yield solution for high-power applications.

SUMMARY

Innovative fiber termination assemblies are provided that are operable and reliable in high power applications, and that also maintaining ease of manufacture and system implementation. Thus, in one aspect of the present invention a fiber termination assembly, includes an optical fiber including a proximal end, a heat conductive housing including opposite proximal and distal openings and an optical passageway defined therebetween, the optical passageway providing an optical path aligned with the openings, and an optical ferrule having proximal and distal ends concentrically disposed about the optical path and positioned between the housing openings, the optical ferrule including a central bore concentrically disposed about the optical path and configured to receive a portion of the proximal end of the optical fiber therein, the optical ferrule and optical fiber secured in relation to the heat conductive housing with epoxy at the distal end of the optical ferrule, wherein the optical ferrule is transparent at a predetermined wavelength of light such that for light coupled into an input surface of the proximal end of the optical fiber at least a portion of the light propagating as cladding modes is stripped out of the optical fiber and transported to and dissipated in the heat conductive housing. The foregoing and other aspects, features, and advantages will become more apparent from the following detailed description, which proceeds with reference to the accompanying figures.

The foregoing and other objects, features, and advantages of the invention will become more apparent from the following detailed description, which proceeds with reference to the accompanying figures.

DETAILED DESCRIPTION

Figure 1:
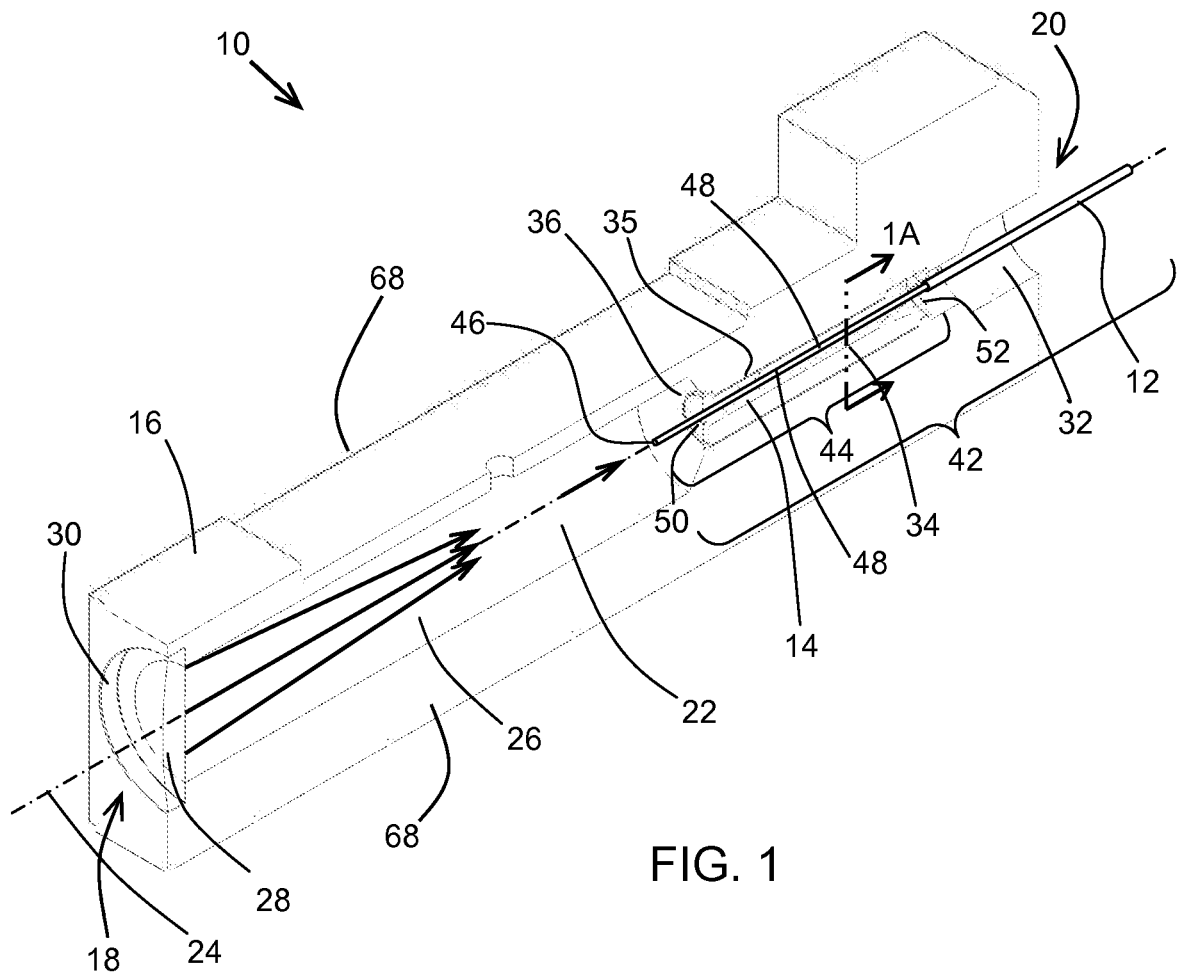
FIG. 1 is a perspective cross-sectional view of an exemplary embodiment of an optical fiber termination assembly in accordance with the present invention.

Referring now to the drawings, FIG. 1 illustrates in cross-section an exemplary embodiment of an optical fiber termination assembly, generally designated 10, in accordance with an aspect of the present invention. The assembly 10 includes an optical fiber 12 inserted into an optical ferrule 14 which is disposed in a heat conductive housing 16 made of copper, copper-tungsten, or other suitable heat conductive material. The housing 16 includes proximal and distal ends 18, 20 and a connecting passageway 22. The passageway 22 is typically defined by one or more bores concentrically disposed about an optical path 24. A proximal end bore 26 provides an input aperture 28 for light to propagate into the assembly 10. Other aperture-limiting elements may be disposed to define what light numerical aperture may be allowed to propagate through passageway 22. A focusing optic 30 can be disposed in the aperture 28 to cause the light to converge inside the passageway 22, as depicted symbolically by convergent arrows in FIG. 1. The focusing optic 30 can also be configured to have a numerical aperture limiting effect.

Figure 1A:
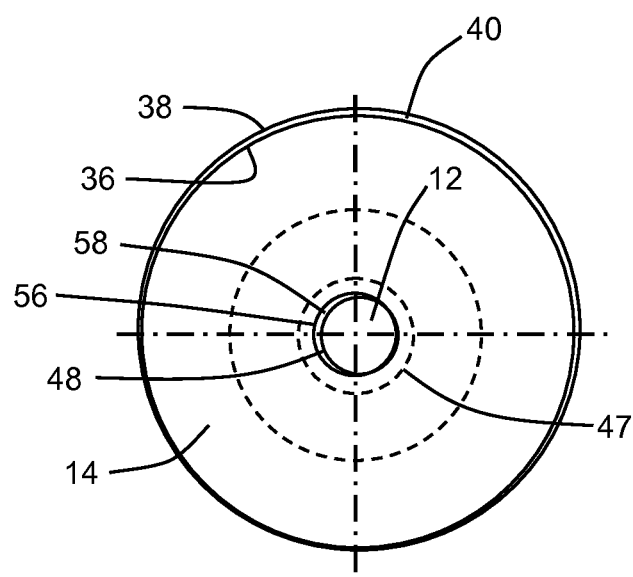
FIG. 1A is a horizontal cross-sectional view of the embodiment shown in FIG. 1.

A distal end bore 32 provides an exit aperture for light to propagate out of the assembly 10 through the optical fiber 12. Distal end bore 32 can include other optical fiber connector components (not shown) for providing stability to the optical fiber 12, such as a crimp ring for terminating and gripping the protective fiber jacketing or a rubber boot for fiber strain relief of bare fiber systems. Epoxy or solder termination of the bare fiber to a fiber termination ferrule may also be performed, or other sealing techniques for hermetic package sealing may be provided. A housing inner bore 34 is in communication with the proximal and distal end bores 26, 32 of the conductive housing 16 and provides a location for the optical ferrule 14 to be disposed. Referring to FIG. 1 and FIG. 1A (showing ferrule 14 in horizontal cross-section), the optical ferrule 14 is shown to be positioned in the inner bore 34 and concentrically aligned with the optical path 24. The outer surface 36 of the ferrule 14 is in contact or very close proximity to an inner bore housing surface 38 of the inner bore 34, creating a very small gap 40. However, gap 40 may be in different ranges for different embodiments. For example, in the embodiment shown in FIG. 1A gap 40 may be in the range of a few microns. In other embodiments, gap 40 may be substantially larger or allow clearance for an intermediate material such as a glass sleeve or epoxy. Ferrule 14 may be temporarily or permanently secured in relation to the inner bore 34 with epoxy or one or more set screws inserted through one or more side holes 35.

Figure 2:
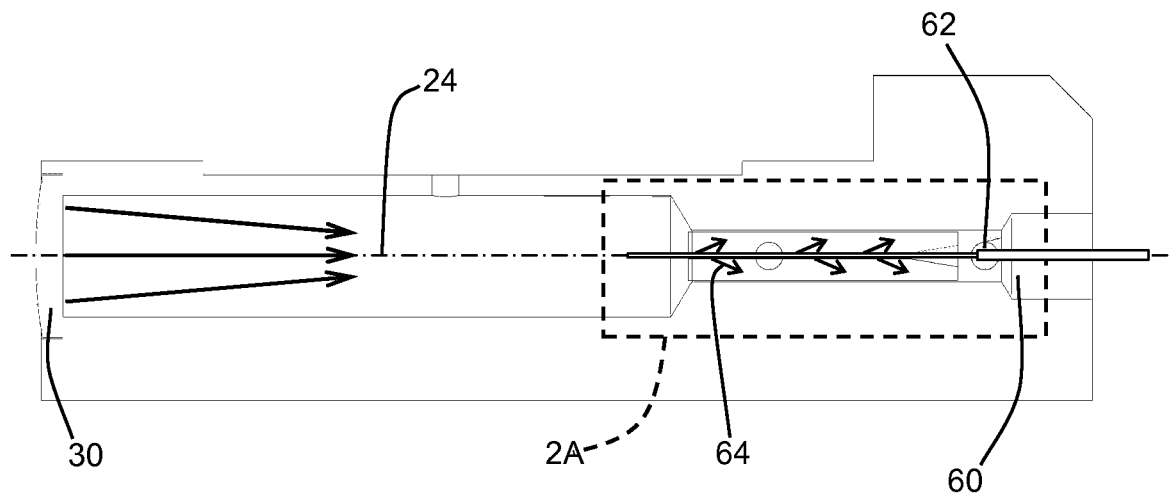
FIG. 2 is a side cross-sectional view of the embodiment shown in FIG. 1.

The proximal end 42 of the optical fiber 12, comprising substantially the entire portion of optical fiber shown in FIGS. 1-2, is inserted into the fiber termination assembly 10 through the distal end bore 32. A portion 44 of the proximal end 42 between a proximal fiber tip 46 and a predetermined distance along the fiber 12 therefrom has the outer layer or layers 47 removed so as to expose an internal cladding surface 48 of the optical fiber 12. The ferrule 14 has proximal and distal ends 50, 52 and also includes a ferrule bore 54 exposing a ferrule bore surface 56 having a diameter that is the same or very close to the diameter of the portion of exposed fiber 44. A diameter difference between the ferrule bore surface 56 and the exposed cladding surface 48 can cause a gap 58 which may be on the order of a few microns in some embodiments. The portion 44 is inserted through the distal end bore 32 as described above and inserted into the ferrule bore 54 of the optical ferrule 14 disposed in the inner bore 34 so as to form an optically coupling with the ferrule bore surface 56.

Figure 2A:
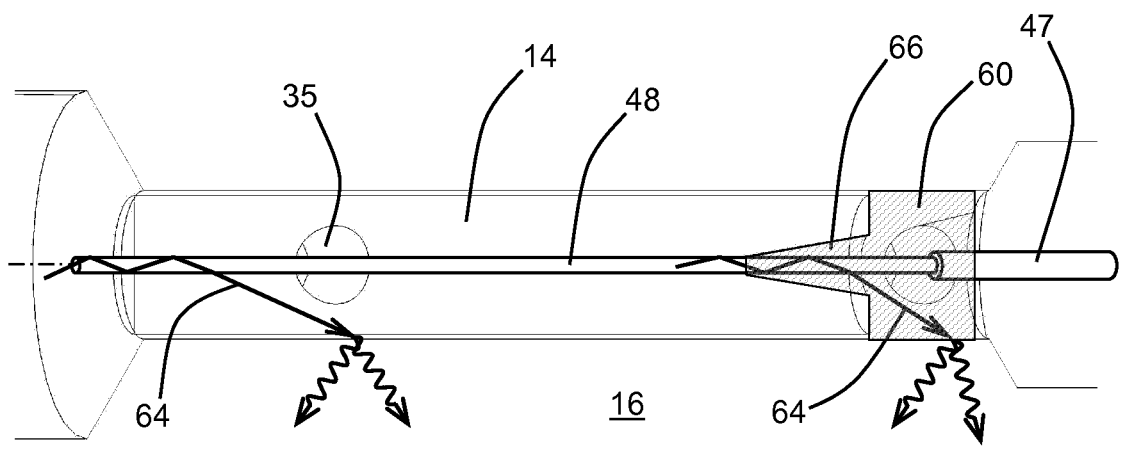
FIG. 2A is close-up view of a portion of the side cross-sectional view shown in FIG. 2.

The portion 44 may extend through the ferrule bore 54 such that the fiber tip 46 is aligned with a proximal end 50 of the ferrule or the fiber tip 46 may extend past or short of the proximal end 50. In typical examples, the fiber tip 46 extends past, as shown in FIGS. 2 and 2A, such that active alignment with a focus of the light through focusing optic 30 (light shown convergent as arrows in FIG. 2) can be achieved by carefully adjusting the z-position of the tip 46 of the optical fiber 12 along the optical path 24. Such z-alignment of the tip 46 with the focus of the light may be accomplished generally without concern for X-Y misalignment given the pre-machined and concentric aspects of the termination assembly 10 with respect to the optical path 24.

After a suitable insertion position is found for the proximal fiber end 42 disposed in the ferrule 14, epoxy 60 may be inserted through one or more epoxy fill ports 62 near the distal end of the ferrule 52. Injected epoxy 60 surrounds portions of the internal fiber surface 48 and outer layers 47 in proximity to the distal end 52, and contacts the surface of the ferrule distal end 52 and the inner bore housing surface 38. By curing or other chemical processes, the epoxy 60 partially or fully secures the ferrule 14, fiber proximal end 12, and heat conductive housing 16 in relation to each other. Also, with the ferrule 14 secure, the fiber tip 46 becomes fixedly disposed at a focal plane of the focusing optic 30, allowing light coupled into the proximal end 18 of the termination assembly 10 to be optimally coupled into the fiber 12.

Even with the advantageous configurability of the fiber tip 46 in relation to light coupled therein provided by the dynamic alignment and curing of the epoxy 60, characteristics of the incident light may be less than optimum. For example, incident light may include a portion having a numerical aperture that exceeds that of the secured optical fiber 12. Additionally, some light coupled into the core of the fiber 12 may escape to become undesirable cladding modes. The optical ferrule 14, shown in transparent cross-section in FIGS. 1, 2, and 2A, is configured to strip the aforementioned undesirable cladding light away from the optical fiber 12 and to sink the energy thereof in the heat conductive housing 16. FIGS. 2 and 2A include exemplary cladding rays 64 being stripped from the optical fiber 12.

The stripping of cladding light is caused by evanescent wave coupling, as will now be described in further detail. The exposed portion 44 of fiber 12 includes a substantial portion thereof with the exposed surface 48 of the portion 44 being situated in close relation to the ferrule bore surface 56 of the ferrule 14. Since portion 44 has the outer layers 47 of the fiber 12 stripped away, the ferrule 14 provides a concentric refractive medium optimized for coupling undesirable cladding light away from the core of fiber 12. In some embodiments the gap 58, depicted in FIG. 1A, is suitably small such that wave coupling may still occur around the entire circumferential interface between the surfaces 48, 56. In other embodiments the wave coupling may occur only in portions of the circumference, such as nearer or at the interface between the surfaces 48, 56. However, in all embodiments case, optical ferrule 14 is configured for stripping at least a portion of the undesired cladding light away from the proximal end 42 of the optical fiber 12. By anti-guiding residual cladding modes, such stripped light that can then be transported to the heat conductive housing 16. In some embodiments the optical ferrule 14 is in close proximity or direct contact with the heat conductive housing 16, as described hereinbefore. In other embodiments, other additional layers or epoxy may be disposed between the outer surface 36 of the optical ferrule 14 and the inner bore housing surface 38 of the heat conductive housing 16.

Ferrule 14 is preferably made from a material that is optically transparent and minimally absorptive. For example, for in-coupled pump light having a wavelength in the range of about 0.8 to 1.1 μm, an optical ferrule 14 made of glass is preferable over zirconia since glass can cause leakage of the undesirable cladding light for transport to the housing 16 while minimally absorbing the transported light. While pump wavelengths in other ranges may also be used, it should be appreciated that various optical fibers 12 may be used as well. For example, optical fiber diameters in pumping applications typically include fiber diameters in the range of 50 to 800 μm. However, the fiber termination assemblies 10 of the present invention may be applied to non-pumping applications as well. For example, fiber termination assemblies in accordance with the present invention may be adapted to terminate signal fibers or single-mode fibers as well. In some examples of fiber termination assemblies 10, one or both surfaces of the proximal and distal ends 50, 52 of the ferrule 14 are coated with a high reflectivity coating for rejection of light other than the light coupled into the fiber tip 46. For example, in pumping configurations, a downstream laser device may produce light at a longer wavelength or may be parametrically converted to another shorter or longer wavelength. Accordingly, in some embodiments, back-reflected light may be rejected and controllably dissipated into the housing 16.

In some embodiments, additional strength and cladding light stripping for the termination assembly 10 is provided by careful selection of the position of the portion 44 of optical fiber 12 having outer layers 47 removed, the length of the ferrule 14, and the position of the epoxy 60. As described hereinbefore, and again referring to FIGS. 2 and 2A, the epoxy 60 is injected or otherwise provided at the distal end 52 of the ferrule 14, securing the fiber 12, ferrule 14, and housing 16 in relation to each other. The exposed surface 48 of the fiber 12 extends distally past the distal end 52 of the ferrule 14 such that epoxy 60 surrounds the exposed fiber surface 48 and penetrates into a frustum bore 66 of the ferrule 14. The epoxy 60 covering the exposed surface 48 provides an additional exit for undesirable light as well as a conductive path for heat to the housing 16. Moreover, the strength of the fiber termination is increased in part due to the extension of the epoxy 60 over the outer layers 47 of the optical fiber 12. In general, however, a substantial portion of stripping of undesirable light occurs in the portion 44 of fiber enclosed by the optical ferrule bore surface 54. While the epoxy 60 can provide some additional stripping, the length for stripping is relatively short, and is generally minimized. This provides further strength protections by minimizing expansion and contraction of the epoxy 60 and corresponding adverse effects to the fiber termination, providing a lower stress termination and preserving fiber brilliance. Also, since the epoxy 60 is spatially separated from the location of highest optical power density at the fiber tip 46, undesirable overheating or burning of the epoxy 60 is avoided. Accordingly, fiber termination assemblies 10 of the present invention are particularly well-suited for handling very large amounts of power, such as pump modules having outputs of 50 W or more. In some examples, 100 W or more of power has been dumped into a termination with a corresponding temperature increase of only 40° C. Even at such high powers, in some embodiments assemblies 10 do not require any additional form of active heat management, such as water-cooling, and may thus be operated in a passive manner.

In particular embodiments, the heat conductive housing 16 includes one or more flat surfaces 68 which may be defined in relation to the optical axis 24. Such surfaces 68 can be mated to surfaces inside a diode pump module (not shown). Registering of housing surfaces 68 internal to a module provides enhanced heat sinking for power stripped from the fiber 12 and dissipated through the housing 16. For example, more than one surface 68 may be registered, and the entirety of the surface 68 may be registered, increasing thermal footprint and leading directly to reduced thermal resistance between the fiber assembly 10 and the module. Moreover, in an internal module configuration, a more direct thermal path is created for the dissipated heat. Also, by including flat registrable surfaces 68, the termination assembly 10 can maintain field replaceability should a failure occur.

It is thought that the present invention and many of the attendant advantages thereof will be understood from the foregoing description and it will be apparent that various changes may be made in the parts thereof without departing from the spirit and scope of the invention or sacrificing all of its material advantages, the forms hereinbefore described being merely exemplary embodiments thereof.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method, comprising:
   forming at least one bore in a fiber termination housing to define an optical path between an optical input and optical output opposite the optical input with at least one portion of the at least one bore situated to receive an optical ferrule having a central bore situated to receive an optical fiber having an exposed cladding surface evanescently coupled across an epoxiless and powderless annular gap extending from the exposed cladding surface to an inner surface of the optical ferrule so that cladding modes propagating in the optical fiber in a direction from the optical input to the optical output are directed out of the optical fiber through the optical ferrule and thermally dissipated through the fiber termination housing.

2. The method of claim 1, further comprising situating the optical ferrule in the at least one portion of the at least one bore.

3. The method of claim 2, further comprising securing the optical ferrule in relation to fiber termination housing with an epoxy or set screw.

4. The method of claim 1, further comprising removing an outer layer of the optical fiber to provide the exposed cladding surface.

5. The method of claim 1, further comprising:
   inserting the optical fiber into the optical ferrule and the at least one bore through the optical output; and
   positioning a tip of the optical fiber in relation to the optical input so that at least one laser beam can be optically coupled into the optical fiber through the optical fiber tip.

6. The method of claim 5, wherein the optical ferrule is concentrically situated with respect to an optical axis of the optical fiber.

7. The method of claim 5, further comprising securing the optical fiber in relation to the fiber termination housing at the optical output.

8. The method of claim 7, wherein the optical fiber is secured to the fiber termination housing with an epoxy between an endface of the optical ferrule facing the optical output and an adjacent portion of the fiber termination housing spatially separate the epoxy from an optical power density associated with the fiber tip.

9. The method of claim 8, wherein the fiber termination housing is a heat conductive housing and wherein the optical input of the fiber termination housing corresponds to a proximal opening and the optical output of the fiber termination housing corresponds to a distal opening;
   wherein the optical ferrule includes proximal and distal ends concentrically disposed about the optical path, is positioned between the proximal and distal openings, and is transparent at a wavelength of the cladding modes;
   wherein the endface of the optical ferrule corresponds to the distal end.

10. The method of claim 7, wherein the endface of the optical ferrule facing the optical output includes a frusto-conical bore.

11. The method of claim 5, further comprising coating at least a portion of one or both endfaces of the optical ferrule to provide a high reflectivity at a first wavelength different from a second wavelength of light selected for coupling into the optical fiber through the optical fiber tip.

12. The method of claim 11, wherein the first wavelength is a signal wavelength and the second wavelength is a pump wavelength.

13. The method of claim 11, wherein the fiber termination housing is situated to dissipate optical energy at the signal and pump wavelengths.

14. The method of claim 5, further comprising coupling at least one laser beam into the optical fiber tip or emitting the at least one laser beam from the optical fiber tip.

15. The method of claim 1, wherein the at least one portion of the at least one bore and the optical ferrule are situated to receive the optical fiber having a fiber diameter selected in the range of 50 µm to 800 µm.

16. The method of claim 1, wherein the optical fiber is a single-mode fiber or a multi-mode fiber.

17. The method of claim 1, wherein the at least one portion of the at least one bore is circular.

18. The method of claim 1, further comprising dissipating cladding energy removed from the optical fiber in the fiber termination housing without using a coolant circulation system, to passively cool the fiber termination housing.

19. An apparatus, comprising:
a fiber termination housing including at least one bore to define an optical path between an optical input and optical output opposite the optical input; and
an optical ferrule situated in at least a portion of the at least one bore and having a central bore situated to receive an optical fiber so that an exposed cladding surface of the optical fiber is evanescently coupled across an epoxiless and powderless annular gap extending from the exposed cladding surface to at least a portion of an inner surface of the optical ferrule and so that cladding modes propagating in the optical fiber in a direction from the optical input to the optical output are directed out of the optical fiber through the optical ferrule and thermally dissipated through the fiber termination housing.

20. The apparatus of claim 19, further comprising the optical fiber situated in the central bore so that an optical fiber tip faces the optical input.

21. The apparatus of claim 19, wherein the fiber termination housing is a heat conductive housing and wherein the optical input of the fiber termination housing corresponds to a proximal opening and the optical output of the fiber termination housing corresponds to a distal opening;
wherein the optical ferrule includes proximal and distal ends concentrically disposed about the optical path, is positioned between the proximal and distal openings, and is transparent at a wavelength of the cladding modes;
wherein the optical ferrule and optical fiber are secured in relation to the fiber termination housing with epoxy at the distal end of the optical ferrule.

22. An apparatus, comprising:
a fiber termination housing including an optical passageway extending between a first end and a second end of the fiber termination housing;
an optical fiber extending from the second end along a portion of the optical passageway and terminating at an optical fiber tip facing the first end and providing an exposed cladding surface;
an optical ferrule having an inner bore defining an inner surface, the inner bore having a diameter larger than an outer diameter of the optical fiber such that an annular gap is defined between the optical ferrule and the optical fiber, the gap being epoxiless and powderless; and
wherein the inner surface of the optical ferrule is evanescently coupled to at least a portion of the exposed cladding surface across the gap so that cladding modes propagating in the optical fiber are directed out of the optical fiber through the optical ferrule and thermally dissipated through the fiber termination housing.

23. The apparatus of claim 22, wherein the fiber termination housing is a heat conductive housing and wherein the first end of the fiber termination housing includes a proximal opening of the optical passageway and the second end of the fiber termination housing includes a distal opening of the optical passageway, and the optical passageway defines an optical path aligned with the proximal and distal openings;
wherein the optical ferrule includes proximal and distal ends concentrically disposed about the optical path, includes a central bore concentrically disposed about the optical path that is configured to receive the optical fiber extending from the second end, is positioned between the proximal and distal openings, and is transparent at a predetermined wavelength of the cladding modes;
wherein the optical ferrule and the optical fiber are secured in relation to the fiber termination housing with epoxy at the distal end of the optical ferrule.

* * * * *